Nov. 18, 1941.  E. S. SMITH, JR  2,263,055
METHOD OF AND MEANS FOR REGULATING A QUANTITY

Filed April 23, 1938

ED S. SMITH, JR.
INVENTOR

BY Maxwell Barus
ATTORNEY

Patented Nov. 18, 1941

2,263,055

UNITED STATES PATENT OFFICE 2,263,055

METHOD OF AND MEANS FOR REGULATING A QUANTITY

Ed S. Smith, Jr., St. Albans, N. Y., assignor to Builders Iron Foundry, Providence, R. I., a corporation of Rhode Island Application April 23, 1938, Serial No. 203,790

13 Claims. (Cl. 137—68)

This invention relates to methods of and means for regulating a variable quantity.

An object of the invention is to provide a novel control system wherein a variable quantity may be controlled with marked promptness and precision and effectively and accurately restored to a given value upon departure therefrom. The invention provides a particularly sensitive control whereby the variable may be effectively restored, without hunting of the controlling means, to the desired value.

A further feature of the invention comprises the provision of means responsive to values of a variable for transmitting cyclical signals in accordance therewith, means governed by the signals for controlling the variable, and asymptotic follow-up means between the controlling and transmitting means. Another feature resides in the provision of pilot means under control of said signals for pacing the control means and the asymptotic follow-up means.

The embodiment of the invention hereinafter described includes, more specifically, means for cyclically transmitting signals in accordance with actual values of the variable, which signals govern controlling means operable in the appropriate direction for restoring the desired value. The latter means in turn is connected to the transmitter through a follow-up means which operates a portion of the transmitter to cause the control means to cease operating. Thereupon, the aforesaid transmitter portion is restored to its previous position under the control of the variable and of an independent asymptotic means. As a result, if the rate of restoration of the variable equals the rate of operation of said asymptotic means, the aforementioned control means remains out of action; but if said rates are unequal, the control means is operated further in one step or several steps of progressively shorter duration, until the desired value of the variable is attained. The restoration of the variable to said value may thereby be accomplished with pronounced speed and accuracy and without hunting.

The invention in addition provides for balancing the departure of the variable against its rate of departure from the desired value and for the transmission of controlling impulses in accordance therewith.

Other features and advantages of the invention will be hereinafter described and claimed.

Figures 1, 2:
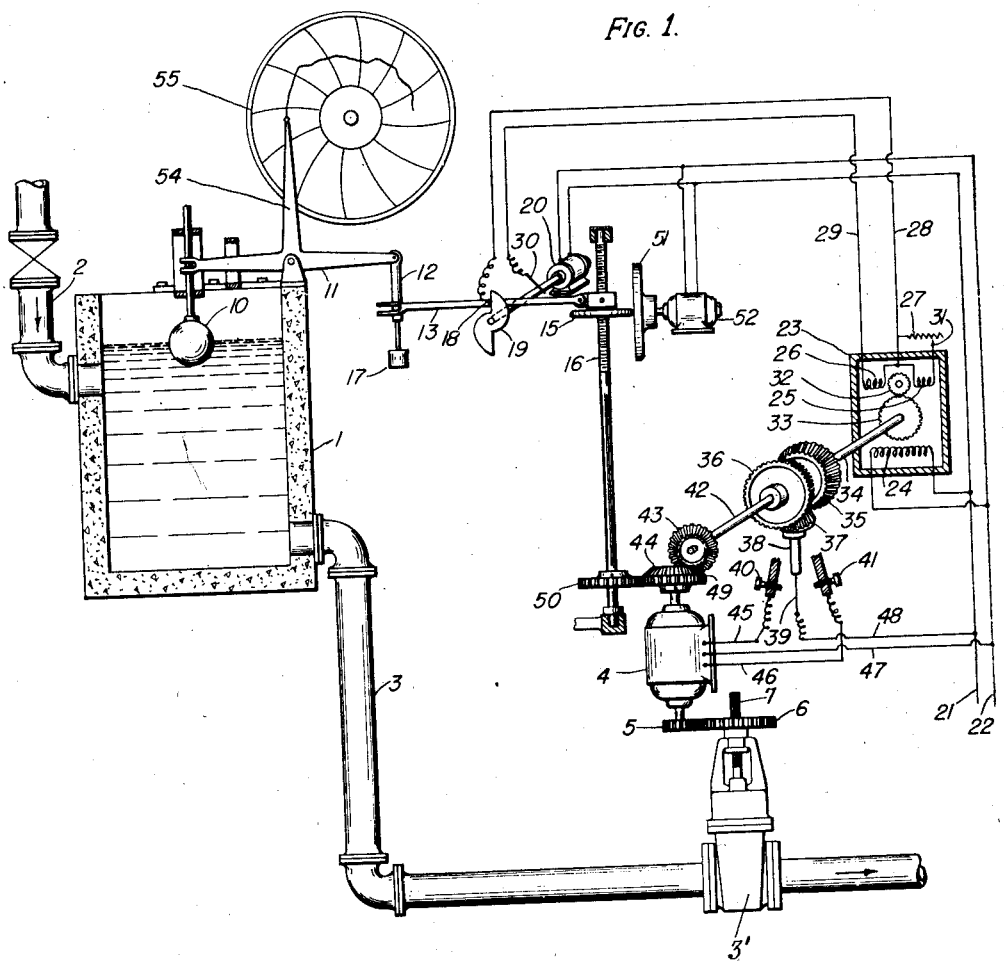
Fig. 1 is a diagrammatic view, with parts in elevation and other parts in vertical section, of an embodiment of my invention.
Fig. 2 is a vertical sectional view of a detail.

For the purposes of illustration, the invention is shown applied to the maintaining of a given level of liquid in a tank 1, though it will be apparent that its utility is not restricted to the control of any particular variable. The tank 1 may be continuously supplied with liquid through an inlet pipe 2, and liquid may flow continuously out of said tank through outlet pipe 3. A suitable valve 3' is interposed in conduit 3, and is operable to different positions through motor 4, pinion 5, and gear 6. The valve may be provided with a threaded stem 7 extending through the gear 6, and the latter may be internally threaded for engagement with said stem, as will be readily understood, so that rotation of said gear will move the valve and stem vertically.

A float 10 depending from one end of lever 11 rises and falls with change of the level of the liquid in the tank 1. Said lever 11 is connected at its other end, through link 12, with an end of a contact lever 13, the opposite end of which contact lever is pivotally connected to a roller 15 movable along a threaded rod 16. Said opposite end of said contact lever may, for example, be pivotally mounted at 14" on a collar 14 which, as shown in Fig. 2, has journaled therein the extension 15' of roller 15. Said extension 15' has threaded engagement with threaded rod 16. One or more pins, such as shown at 14', may be passed through collar 14 into a circumferential groove 15" in the extension 15', so that said collar 14 is movable with extension 15' and roller 15 along the rod 16 but does not participate in the rotation of said roller and extension. A counter weight 17 may be attached to link 12 as shown.

Lever 13 carries a contact 18 adapted to engage the face of a cam 19 which is continuously rotated at constant speed by a synchronous motor 20. The latter is connected to alternating current mains 21, 22. Cam 19 is so shaped, for example, that the difference between the periods of engagement and disengagement of contact 18 therewith in each cycle is proportional to the departure from a given level of liquid in the tank 1.

For controlling the operation of the valve shifting motor 4 there is shown a pilot motor 23. The latter may comprise any suitable reversible motor and is illustrated as a well-known type of motor comprising a field coil 24 constantly connected across the mains 21, 22, and further comprising shading coils 25, 26. A circuit through coil 25 is continuously closed through a resistance 27 in series with said coil as shown. Coil 26 is connected through wires 28 and 29 with contact 18 and cam 19, respectively, so that a low resistance circuit through said coil 26 is closed whenever said contact is engaged with said cam and is broken whenever said contact and cam are disengaged. The wire 29 may conveniently be connected to cam 19 through a brush 30 engaging the shift on which said cam is secured.

As long as the circuit through coil 26 is open, the pilot motor 23 will run steadily in one direction, and as long as said circuit is closed said motor will run steadily in the opposite direction. While in the present example of the invention the resistance in series with the coil 25 is so chosen that the forward and reverse speeds are equal, it will be understood that, if desired, said resistance may be varied, through the manually adjustable contactor 31, to vary the ratio between the forward and reverse speeds to the extent desired.

The motor 23, through pinion 32 on its shaft and gear 33 meshing with said pinion, drives a shaft 34 on which is fastened a bevel gear 35 of a differential gearing 35, 36, 37. Pinion 37 of said differential gearing meshes with gears 35, 36 and carries an arm 38 from which extends a resilient contact arm 39 projecting between a pair of contacts 40, 41. Said arm 38 acts as the conventional spider element of the differential gear system 35, 36, 37, and turns about the axes of gears 35, 36 whenever said gears move unequally. Gear 36 is fastened on a shaft 42 which has secured thereto at its other end a bevel gear 43 meshing with a bevel gear 44 on the shaft of motor 4.

Motor 4 may be of any suitable reversible type and may, for example, comprise a pair of field windings for causing operation of its armature in opposite directions, respectively; one of said windings being connected by a wire 45 with contact 40 and the other being connected by a wire 46 with contact 41, both windings being furthermore connected by return wire 47 with main 22. Contact blade 39 is connected to main 21 by wire 48.

So long as the level of liquid in the tank 1 is at the desired value, the lever 13 is in such position that its contact 18 will, through engagement with cam 19, close the circuit through coil 26 in each 180° of rotation of said cam for a period equal, for example, to the period in which said contact and cam are disengaged. Under these conditions, the pilot motor 23 operates the arm 38 through equal extents in opposite directions in each half-cycle of rotation of said cam. In other words, as long as the height of liquid in tank 1 is such that the respective periods of energization and de-energization of coil 26 in each cycle are equal, arm 38 simply oscillates through equal extents, and without engaging contact blade 39 with either contact 40 or 41. Valve motor 4 remains out of action as long as this condition continues.

If the liquid level in tank 1 is for any reason (such as diminished inflow through pipe 2 or increased outflow through pipe 3) lower than the level desired, float 10 descends, and lever 13 is raised about its pivot 14", whereupon coil 26 is energized in each cycle for a shorter period than its period of deenergization. Consequently, arm 38 is operated through a greater extent in one direction than the other, said arm moving further toward that one of the contacts 40, 41, which when engaged by resilient blade 39 will cause motor 4 to operate the valve 3' in such direction as to decrease the rate of outflow from tank 1. As soon as motor 4 commences operating, gear 36 is turned thereby in such direction as to move arm 38 to disengage blade 39 from said contact, and upon such disengagement said motor 4 is deenergized. Said blade and contact are disengaged when motor 23 ceases rotating gear 35 in the direction for engaging said contacts.

The aforesaid operation of motor 4 actuates not only the gear 36 as above noted, but also turns the threaded rod 16 through gears 49, 50, drawing roller 15 downwardly. Roller 15 is continuously in frictional engagement with a disk 51. Normally, said roller engages the center portion of disk 51, which is continuously rotated at constant speed by synchronous motor 52, connected to mains 21, 22. In the foregoing example, wherein lever 13 is raised in response to decrease in liquid level in the tank 1, the ensuing operation of the valve motor 4 in the direction for shifting the valve toward closed position draws roller 15 downwardly, likewise drawing downwardly the pivot 14", until lever 13 is so positioned that contact 18 is once more in engagement with cam 19 for a duration in each cycle equal to the duration of disengagement between said cam and contact. As a result, pilot motor 23 resumes operation of contact 39 within the gap between contacts 40, 41 without engaging either of said contacts, and the valve motor 4 is out of action.

The liquid level in tank 1 is now rising due to the aforesaid actuation of the valve 3' in outlet pipe 3. The end of lever 13 adjacent link 12 is thus descending. Concurrently, due to the rotation of disk 51, the roller 15, threaded on rod 16, which is now stationary, is returned upwardly toward the center of said disk.

It will be seen that the rate of restoration of the roller 15 toward the center of the disk 51 is constantly decreasing, due to the diminishing distance from said roller to said center. Also, the rate of restoration of the desired level is constantly decreasing as the desired level is approached. The aforesaid roller and level are both in other words restored asymptotically. Now as long as the diminishing rate of restoration of the level, responsive to the aforesaid operation of the valve toward closed position, equals the diminishing rate of approach of roller 15 to the center of disk 51, the left hand end of lever 13 will descend at the same rate that its right hand end ascends, and the relation of contact 18 to cam 19 is undisturbed. Under these conditions, the lever 13 will simply pivot about the contact 18 without changing the duration of the signals to the motor 23, and thus without bringing contact 39 into engagement with either of contacts 40, 41. The lever 13 is thus restored to normal position without disturbing the equal periods of opening and closing of the motor coil 26, so that the motor 4 remains out of action.

The rate of shifting of the roller 15 with respect to the center of disk 51 is governed by the pitch of the threads of rod 16, the roller diameter, the ratio of the gears 49, 50, the speed of motor 4, and the speed at which disk 51 is driven. The speed of rotation of disk 51 may be set manually to any desired value, for which purpose any suitable or conventional change-speed gearing, for example, may be utilized between motor 52 and disk 51.

If the rate of restoration of the liquid level in the tank 1 is less than the rate of restoration of roller 15 toward the center of disk 51, the end of said lever attached to roller 15 will be operated more rapidly than the other end of said lever, with resultant shifting of the contact 18 to again energize the motor coil 26 for a less period than that in which it is deenergized, and the valve motor 4 is again brought into action to nudge the valve further toward closed position. Concurrently roller 15 is again drawn away from the center of disk 51 until equal periods of energization and deenergization of the coil 26 are produced. This operation of valve motor 4 is of shorter duration than the initial operation thereof above described. Upon cessation of the second operation of said motor 4 the disk is again operated toward the center of the disk 51. If the rates of restoration of liquid level and roller 15 are again unequal, the motor 4 is again operated, for an interval of still briefer duration than its preceding operation, giving the valve a further nudge toward closed position. This intermittent operation continues until the desired level in the tank 1 is restored.

If, following the initial shifting of the valve towards closed position in response to decrease in level in tank 1 as hereinbefore described, the rate of increase in level is greater than the rate of restoration of roller 15, contact 18 will be shifted to energize coil 26 for a period longer than that in which said coil is deenergized, with consequent operation of the valve toward its open position. This operation of the valve will be less than its previous operation toward closed position and will cut down the rate of restoration of level. Following this, the roller 15 will be again restored by disk 51 toward the center of said disk and any further difference between the rate of restoration of level and the rate of restoration of the roller 15 will be manifested by a further nudge of the valve toward the position appropriate for bringing the level in tank 1 to the proper value.

It will be apparent from the foregoing description that when the rate of restoration of the level is not equal to that of the roller 15, the valve motor, following its initial operation, is operated for diminishing intervals, nudging the valve in a series of diminishing steps toward its proper position, until the level is brought to the desired value. If, on the other hand, the rate of restoration of the level equals the rate of restoration of roller 15, the initial operation of the motor 4 has sufficed to set the valve into its appropriate position and further nudges of said valve do not take place. In either event the valve is promptly set into its proper position, and the level brought to its desired value, without hunting of the valve and in a particularly effective and sensitive manner.

The operation in response to a rise in level above the desired elevation is similar to that described above, except that the end of lever 13 connected to the link 12 is lowered, shifting the contact 18 to close the circuit through coil 26 in each cycle for a longer period than said circuit is open, and the valve motor is operated in such direction as to shift the valve away from closed position, concurrently raising the roller 15 above the center of disk 51. If the initial setting of said valve is not sufficient, it will be nudged in successively diminishing steps to the position in which the level is maintained at the value desired.

If, instead of having the level change suddenly, the input rate is, for example, suddenly increased to a new constant value, the action will be much as before, except that the level instead of increasing suddenly will increase at a fixed rate, corresponding with the change in the input rate. The controlling action is much as before, i. e., the roller 15 will be moved upwardly from the center of disk 51 at a rate corresponding to the increase in the input rate. However, very soon the roller 15 will reach a position which will cause contact 18 to create off-on impulses of substantially equal duration, after which the asymptotic restoration of level and roller will occur substantially as before.

In many cases, however, the rate of increase of the input flow rate will be constant, in which case the level will initially increase in second-power relation with time. The roller 15 will be moved upwardly also in second-power relation with time. However, very soon it will asymptotically approach a fixed distance from the center of its driving disk 51, such as to maintain the substantially constant departure of the level from its predetermined value. In other words, the length of the impulses depends both upon the departure and the rate of departure of the level. It is this relation which, in practice, determines the choice of the speed of motor 52 driving disk 51, the speed being chosen to keep roller 15 on the disk 51 at the maximum rate of change of the input flow rate.

This end is achieved by virtue of the fact that as the roller 15 moves outwardly from the center of disk 51, it is being rotated by said disk at a constantly increasing speed in a direction opposing its outward movement due to turning of screw shaft 16. In other words, in this case, the roller will be screwed out to a radius such that its rate of turning is high enough to enable it to settle at a position substantially corresponding with the departure of the level from its predetermined value. Of course, in such case the signals are not equal, but the valve motor 4 turns at an average rate high enough to balance off the departure. Obviously the rate of input cannot increase indefinitely at a constant rate, but must soon reach a maximum value in any practical case, and when this maximum value is reached, the valve motor brings the valve to such position as to restore the level to the predetermined value, as in the first cases discussed.

As previously noted, the rate of movement of the roller 15 towards or away from the center of disk 51 is dependent upon the pitch of the threads on rod 16, the diameter of said roller, the ratio of the gears 49, 50, the speed of motor 4, and the speed of the disk 51. The pitch of said threads, diameter of said roller, and gear ratio aforesaid may be chosen as most suitable for any particular control installation, and the shifting of said roller with respect to the disk may be further regulated by variation of the speed of rotation of disk 51, as above described, so that marked speed and precision of restoration of the desired value of the variable may be obtained.

It will be noted that by suitably spacing the contacts 40, 41, the contact blade 39 may be permitted to move a finite distance in either direction within said space without causing operation of the valve motor 4, but upon accumulation of sufficient variations in one direction or the other said motor 4 operates to shift the valve in the appropriate direction for restoring the level in tank 1 to within the range of permissible departure. The motor 23 and associated contact mechanism may thus function as a form of integrator.

Owing to the resiliency of the blade 39, a slight operation of motor 23 is permitted after engagement of either pair of contacts.

The lever 11 may be provided with an extension 54 having at its upper end a stylus engaging a chart 55 continuously rotated at constant speed by any suitable means, so that a continuous record of the level in the tank 1 is obtained.

Matter disclosed but not claimed herein is claimed in my copending application, Serial No. 180,486, filed December 18, 1937, of which the present application is a continuation in part.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a controller, a member operable at one end through extents commensurate with variations in values of a variable from a predetermined value, an element to which the opposite end of said member is pivoted, means cooperating with said member for sending signals corresponding with said variations in value of said variable, means operable under control of said signals for controlling said variable and concurrently drawing said element away from a normal position, until said member is so positioned as to cause termination of operation of said controlling means, and means for asymptotically restoring said element to said normal position.

2. A controller as defined by claim 1 wherein the element comprises a roller and the asymptotic restoring means comprises a continuously rotating disk engaging said roller.

3. In combination, a member positionable in accordance with actual values of a variable, motor means operable at substantially constant speed, means controlled jointly by said member and said motor means for cyclically transmitting signals of a function of time according to said actual values, means responsive to said signals for controlling said variable to restore a given value thereof upon departure therefrom, follow-up means controlled by said controlling means for operating said transmitting means to terminate operation of said controlling means, and means for asymptotically restoring said follow-up means upon termination of operation of said controlling means.

4. In combination, means responsive to actual values of a variable for cyclically transmitting complemental "on-off" impulses according to said values, means for controlling said variable, pilot means responsive to departure from equality of said "on-off" impulses for causing operation of said controlling means in such direction as to restore a predetermined value of said variable, means controlled by said controlling means for setting an element of said transmitting means to restore equality between said "on-off" impulses and means for asymptotically restoring said element to normal position following termination of the operation of said controlling means.

5. A method of maintaining a predetermined value of a variable comprising cyclically transmitting complemental on-off signals in accordance with the actual value of the variable, modifying said variable in response to departure from equality of said on-off signals, actuating a signal controlling element to restore equality of said signals before restoration of said variable to said predetermined value, asymptotically restoring said element, and controlling said signals in accordance with the difference between the rate of restoration of said variable and the rate of restoration of said element.

6. In combination, means for cyclically transmitting complemental on-off signals the difference between which is commensurate with the extent of departure of the actual values of a variable from a predetermined value, means controlled by said signals for modifying said variable in response to departure of said signals from equality, means controlled by said modifying means for shifting a portion of said transmitting means to restore equality between said signals, and means for restoring said transmitter portion asymptotically.

7. In a regulating system, means responsive to departures of a variable from a predetermined value, means for controlling said variable, and means controlled by the first two mentioned means for balancing the departure of said variable against the rate of departure, the last mentioned means comprising an element movable away from a normal position concurrently with operation of said controlling means, and means for returning said element at continuously decreasing rates toward said position following said operation of said controlling means.

8. In a regulating system, the combination of means positionable in correspondence with the departure of a variable from a predetermined value, cyclical impulse transmitting means connected thereto, means for controlling said variable governed by said impulses, and asymptotic follow-up means operatively connecting said controlling means and said transmitting means to cause the latter to transmit impulses in accordance with the departure and rate of departure of said variable from its predetermined value.

9. In a regulating system, a lever, means connected to one end of said lever for setting the latter in response to departures of a variable from a desired value, means governed by an intermediate portion of said lever for operation in a direction to restore said variable to said value, means controlled by said restoring means and connected to the opposite end of said lever for setting said lever into a position wherein operation of said restoring means is terminated, and means connected to said opposite end of said lever for resetting said opposite end asymptotically to its normal position.

10. In combination, means for controlling a variable, means for cyclically producing upon said controlling means effects commensurate with departures of said variable from a given value to cause operation of said controlling means for restoring said variable to said value, means operated by said controlling means for setting a portion of said effect-producing means to cause termination of the restoring operation of said controlling means, and means for returning said portion of said effect-producing means to its normal position asymptotically.

11. In a regulating system, means for controlling a variable, means comprising a lever and a cyclically operable element for transmitting cyclical signal impulses to said controlling means, follow-up means between said controlling means and an end of said lever for enabling said controlling means to shift said end into such position as to terminate operation of said controlling means, and means for asymptotically restoring said end of said lever to its normal position.

12. In a regulating system, means operable in response to departures of a variable from a given value, intermediate means one part of which is moved from a given position by said first means, means governed by said intermediate means for operation in a direction to restore said variable to said given value, means controlled by said restoring means for moving a second part of said intermediate means to such a position as to terminate operation of said restoring means, and means for restoring said second part of said intermediate means asymptotically to its normal position.

13. In a regulating system, means operable in response to departures of a variable from a given value, intermediate means one part of which is moved from a given position by said first means, means governed by said intermediate means for operation in a direction to restore said variable to said given value, means controlled by said restoring means for moving a second part of said intermediate means to such a position as to terminate operation of said restoring means, and means including an element movable at substantially constant speed and a part cooperating therewith and movable at variable speeds for restoring said second part of said intermediate means asymptoticaly to its normal position.

ED S. SMITH, JR.